US009855712B2

(12) United States Patent
Rodriguez et al.

(10) Patent No.: US 9,855,712 B2
(45) Date of Patent: Jan. 2, 2018

(54) METHODS OF MANUFACTURING AND APPARATUS USEFUL IN MANUFACTURING TORIC CONTACT LENSES

(71) Applicant: CooperVision International Holding Company, LP, St. Michael (BB)

(72) Inventors: Fernando Andres Bejarano Rodriguez, Caguas, PR (US); Carlos Sandoval Amaral, Barranquitas, PR (US); Ruben Joel Colon, Santa Isabel, PR (US); Fernando Rentas Pedrogo, Coamo, PR (US)

(73) Assignee: COOPERVISION INTERNATIONAL HOLDING COMPANY, LLP, St. Michael (BB)

( * ) Notice: Subject to any disclaimer, the term of this patent is extended or adjusted under 35 U.S.C. 154(b) by 197 days.

(21) Appl. No.: 14/895,271

(22) PCT Filed: Jun. 23, 2014

(86) PCT No.: PCT/GB2014/051916
§ 371 (c)(1),
(2) Date: Dec. 2, 2015

(87) PCT Pub. No.: WO2014/207443
PCT Pub. Date: Dec. 31, 2014

(65) Prior Publication Data
US 2016/0151986 A1 Jun. 2, 2016

Related U.S. Application Data

(60) Provisional application No. 61/839,691, filed on Jun. 26, 2013.

(51) Int. Cl.
*B29D 11/00* (2006.01)
*B25B 5/10* (2006.01)
*B25B 5/14* (2006.01)

(52) U.S. Cl.
CPC .......... *B29D 11/00509* (2013.01); *B25B 5/10* (2013.01); *B25B 5/147* (2013.01); *B29D 11/00317* (2013.01)

(58) Field of Classification Search
CPC ........ B29D 11/00509; B29D 11/00317; B25B 5/10; B25B 5/147
See application file for complete search history.

(56) References Cited

U.S. PATENT DOCUMENTS

| 4,621,821 A | 11/1986 | Schneider |
| 5,110,278 A | 5/1992 | Tait et al. |

(Continued)

FOREIGN PATENT DOCUMENTS

| EP | 1158339 A1 | 11/2001 |
| WO | 2007068892 A1 | 6/2007 |

*Primary Examiner* — Mathieu Vargot
(74) *Attorney, Agent, or Firm* — Stout, Uxa & Buyan, LLP; Frank J. Uxa (57) ABSTRACT

Method and apparatus of manufacturing a toric contact lens comprising providing a toric insert (12) without an orientation mark to be used in forming a toric contact lens mold section; placing the toric insert without an orientation mark in an orientation mark fixture (10) comprising a single piece fixture housing (20) structured to hold a toric insert at an angle specified for an orientation mark, the fixture housing having intersecting surfaces (36, 40) which form a generally V-shaped region on which the toric insert is located, the generally V-shaped region contacting the toric insert at two different contact points, lines or areas; fixing the toric insert without an orientation mark to the orientation mark fixture; forming an orientation mark on the toric insert fixed to the orientation mark fixture; using the toric insert with the orientation mark to form a toric contact lens mold section; and using the toric contact lens mold section to form a toric contact lens.

16 Claims, 5 Drawing Sheets

(56) References Cited

U.S. PATENT DOCUMENTS

| | | |
|---|---|---|
| 6,467,903 B1 | 10/2002 | Back |
| 6,471,891 B1 | 10/2002 | Cameron |
| 6,878,314 B2 | 4/2005 | Cameron |
| 7,319,133 B2 | 1/2008 | Brame et al. |
| 7,320,587 B2 | 1/2008 | Goodenough et al. |
| 7,360,890 B2 | 4/2008 | Back |
| 7,426,993 B2 | 9/2008 | Coldrey et al. |
| 7,731,873 B2 | 6/2010 | Darnton et al. |
| 7,750,079 B2 | 7/2010 | Almond et al. |
| 7,780,881 B2 | 8/2010 | Goodenough et al. |
| 7,785,092 B2 | 8/2010 | Rogers |
| 7,799,249 B2 | 9/2010 | Goodenough et al. |
| 7,891,071 B2 | 3/2011 | Collazo |
| 8,298,458 B2 | 10/2012 | Rogers |
| 8,367,746 B2 | 2/2013 | Manesis et al. |
| 2002/0003605 A1 | 1/2002 | Rogers et al. |
| 2006/0145372 A1 | 7/2006 | Jones |
| 2007/0035049 A1 | 2/2007 | Bruce et al. |
| 2009/0059166 A1 | 3/2009 | Suzuki et al. |

METHODS OF MANUFACTURING AND APPARATUS USEFUL IN MANUFACTURING TORIC CONTACT LENSES

The present application is a U.S. national phase application of International Application No. PCT/GB2014/051916, filed Jun. 23, 2014, and claims the benefit of U.S. Provisional Application Ser. No. 61/839,691, filed Jun. 26, 2013, the disclosure of each of said prior applications is incorporated in its entirety herein by reference.

RELATED APPLICATION

The present application claims the benefit of U.S. Provisional Application Ser. No. 61/839,691, filed Jun. 26, 2013, the disclosure of which is incorporated in its entirety herein by reference.

The present disclosure relates to the manufacture of lenses, such as molded lenses. More particularly, the disclosure relates to methods of manufacturing molded toric contact lenses and apparatus useful in manufacturing such lenses.

BACKGROUND

Astigmatism is a defect in the eye that is corrected by a lens with a non-spherical prescription. The prescription, which is usually expressed as cylinder on the patient's prescription order, causes at least a portion of the surface of the lens to have the shape of a toric segment. Hence, such lenses are called toric lenses.

While the posterior surface of a contact lens is generally spherical in configuration, where the lens is used to correct astigmatism it will have a toric configuration.

A toric corrective lens should be properly oriented, for example, angularly oriented, with respect to the eye of the wearer for optimal effectiveness. Soft contact lenses which have been designed for use to correct astigmatism are well known in the art. Generally these lenses rely on some type of ballasting method to cause the lens to ride at the proper orientation or location on the eye. An ideal lens for correcting astigmatism has good rotational orientation. That is, the intended top of the lens should be located at the top of the wearer's eye when the lens is worn.

Mold sections, that is first or female mold sections and second or male mold sections, are used together in producing a cast molded contact lens. When a toric contact lens is to be produced or manufactured by cast molding, it is important that the male and female mold sections be properly rotationally oriented, to give the desired astigmatism correction. Put another way, it is important, in order to achieve the desired astigmatism correction, that the toric zone of the lens be oriented at a specific rotational position.

In order to identify the specific rotational orientation of a toric zone of a contact lens, it is common practice to form an axis orientation mark on the lens during lens manufacture to allow the lens fitting professional to confirm the prescription of the lens, for example, while the lens is in the wearer's eye.

Previously, such an axis orientation mark was printed onto the lens, for example, using a silicone print pad. See U.S. Pat. No. 6,878,314.

More recently, the female mold section toric insert has been provided with an orientation mark which is "transferred" to the female mold section and, when the female mold section is used to produce a lens, to the lens as an axis orientation mark. The orientation mark is cut or machined onto the female toric insert by a wire electrical discharge machining computer numerically controlled machine or EDM CNC machine.

The EDM CNC machine requires an orientation mark fixture for holding the female toric insert in place during the cutting or machining process. Ideally, this orientation mark fixture should provide for the proper position, orientation and fixation of the toric insert so as to obtain accuracy and repeatability from the machining process.

However, the orientation mark fixtures that have been used in the past have not been fully satisfactory. For example, the following problems have been identified with such orientation mark fixtures. The toric inserts can be, and have been, wrongly located on the previous orientation mark fixtures, which allowed the toric inserts to be located at different positions inside the fixture leaving two degrees of freedom for the insert to move. This condition does not assure the correct position, that is the centricity, of the orientation mark with respect to the outer diameter of the insert.

In addition, with the previous orientation mark fixtures, the position of the toric insert was not fixed, since the insert was mounted on the fixture with a slide fit on different locating holes. Also, the positioning angle of the fixture locating holes was a resultant of two components: a sync plate and a dedicated fixture plate.

In summary, the previous orientation mark fixtures did not assure that the orientation mark was placed on the toric inserts in the proper position, orientation and fixation on a repeatable basis.

There is a need for new methods and apparatus to address these and other issues.

SUMMARY

New methods of manufacturing molded toric contact lenses and apparatus useful in manufacturing such lenses are disclosed herein.

Methods of manufacturing toric contact lenses using orientation mark fixtures to form orientation marks on toric inserts and orientation mark fixtures are disclosed. The disclosed methods and fixtures reduce, or even substantially eliminate, the dimensional and/or positional variations or inaccuracies, for example, as noted above, which resulted from the use of previous orientation mark fixtures.

The methods of manufacturing a toric contact lens of the present disclosure include methods comprising: providing a toric insert without an orientation mark to be used in forming a toric contact lens mold section; placing the toric insert without an orientation mark in an orientation mark fixture comprising a single piece fixture housing structured to hold a toric insert at an angle specified for an orientation mark, the fixture housing having intersecting surfaces which form a generally V-shaped region on which the toric insert is located, the generally V-shaped region contacting the toric insert at two different contact points, lines or areas; fixing the toric insert without an orientation mark to the orientation mark fixture; forming an orientation mark on the toric insert fixed to the orientation mark fixture; removing the toric insert with the orientation mark from the orientation mark fixture; using the toric insert with the orientation mark to form a toric contact lens mold section; and using the toric contact lens mold section to form a toric contact lens.

The method of manufacturing can be a method which comprises using a wire in forming the orientation mark on the toric insert, such as, for example, a wire EDM CNC machine.

The method can be a method wherein the step of fixing the toric insert comprises fixing the toric insert using at least one fixing mechanism.

The method can be a method wherein the at least one fixing mechanism comprises a locating screw located generally opposite an intersection of the intersecting surfaces.

The method can be a method wherein the method further comprises the step of orienting the toric insert without an orientation mark in the orientation mark fixture.

In one example of a method comprising an orientation step, the bottom of the toric insert includes a groove at a location, the orientation mark fixture further comprises a pin, the step of orienting the insert comprises placing the pin into both the fixture and the groove of the insert thereby orienting the insert in the fixture with respect to the location of the groove on the bottom of the toric insert. In such an example, placing the pin into both the fixture and the groove of the insert can result in fixing the toric insert without an orientation mark to the orientation mark fixture and in orienting the toric insert without an orientation mark in the orientation mark fixture.

In another example of a method comprising an orientation step, the bottom surface of the toric insert is flat and the fixture or orientation mark fixture further comprises a fixture groove or ridge located on an interior or exterior surface of the fixture housing, and the step of orienting the insert comprises using the fixture groove or ridge and orienting the insert in the fixture with respect to the fixture groove or ridge.

The present disclosure is also directed to fixtures for positioning a toric contact lens insert to facilitate forming an orientation mark on the toric insert, the fixture comprising: a fixture housing comprising a single part structured to hold a toric contact lens insert at an angle specified for the placement of an orientation mark on the toric insert, the fixture housing having intersecting surfaces forming a generally V-shaped region on which a toric insert is placed, the generally V-shaped region contacting the toric insert at two different contact points, lines or areas; and at least one fixing mechanism operable to fix the position of the toric insert relative to the fixture housing.

In one example, the fixing mechanism can comprise a locating screw located generally opposite an intersection of the intersecting surfaces.

In one example, the fixture can further comprise at least one orientation mechanism effective to orient the toric contact lens insert. For example, the orientation mechanism can comprise a pin positioned within the fixture housing and passing into or through a groove of the toric insert, the toric insert having a bottom opposite an optical molding surface of the insert, the bottom having the groove, and the groove having a width to accommodate the pin, and the orientation mechanism orients the toric insert in the fixture with respect to the location of the groove on the bottom of the toric insert. In a particular example, the pin can be one of the at least one fixing mechanism operable to fix the position of the toric insert relative to the fixture housing, and one of the at least one orientation mechanism effective to orient the toric contact lens insert.

In another example, the orientation mechanism can comprise a fixture groove or ridge located on an interior or exterior surface of the fixture housing, the toric insert is a toric insert having a flat bottom surface, and the fixture groove or ridge is adapted to orient the toric insert having a flat bottom surface in the fixture housing with respect to the location of the fixture groove or ridge.

In yet another example, the orientation mechanism can comprise a passage within the fixture housing adapted to accommodate the distal end of the toric insert.

The fixture, including the fixture housing and the other components of the fixture, may be constructed of any suitable materials or materials of construction, provided that the fixture achieves the desired results. In one example, the fixture housing comprises a metal or combination of metals.

The contact lenses manufactured using the disclosed methods and orientation mark fixtures may be cast molded, soft, toric contact lenses. The contact lenses manufactured using the disclosed methods and orientation mark fixtures may be cast molded, hydrogel, toric contact lenses, including silicone hydrogel toric contact lenses. Examples of such lenses, and the lens materials that may be used to produce such lenses and the methods by which toric contact lens mold sections may be used to produce such lenses are provided in the following patents and publications, each of which is hereby incorporated by reference herein.

Included among these patents and patent publications are U.S. Pat. No. 6,467,903; U.S. Pat. No. 8,367,746; U.S. Pat. No. 7,320,587; U.S. Pat. No. 7,780,881; U.S. Pat. No. 7,731,873; U.S. Pat. No. 7,785,092; U.S. Patent Publication 2007-0035049; U.S. Pat. No. 8,298,458; U.S. Pat. No. 7,319,133; U.S. Pat. No. 7,426,993; U.S. Pat. No. 7,360,890; U.S. Pat. No. 7,750,079; U.S. Pat. No. 7,799,249.

Various examples are described in detail in the detailed description and additional disclosure below. Any feature or combination of features described herein are included within the scope of the present disclosure provided that the features included in any such combination are not mutually inconsistent as will be apparent from the context, this specification, and the knowledge of one of ordinary skill in the art. In addition, any feature or combination of features may be specifically excluded from any embodiment. Additional advantages and aspects are apparent in the following detailed description, additional disclosure, and drawings in which like parts bear like reference numerals.

DETAILED DESCRIPTION

A method of manufacturing a contact lens is disclosed and comprises:

providing a toric insert without an orientation mark to be used in forming a toric contact lens mold section;

placing the toric insert without an orientation mark in an orientation mark fixture comprising a single piece fixture housing structured to hold a toric insert at an angle specified for an orientation mark, the fixture housing having intersecting surfaces which form a generally V-shaped region on which the toric insert is located, the generally V-shaped region contacting the toric insert at two different contact points, lines or areas, such as, for example, to centralize the toric insert located on the generally V-shaped region in the fixture housing;

fixing the toric insert without an orientation mark, for example, located on the generally V-shaped region, to the orientation mark fixture;

forming an orientation mark on the toric insert fixed to the orientation mark fixture;

removing the toric insert with the orientation mark from the fixture;

using the toric insert with the orientation mark to form a toric contact lens mold section; and using the contact lens mold section to form a toric contact lens.

In one example, the method of the present disclosure can provide that the generally V-shaped region centralizes the toric contact lens insert in the fixture based on a diameter of the toric insert.

Fixing the toric insert to the fixing housing can comprise using an adhesive substance such as, for example, an adhesive wax, to adhere the insert to the fixture housing. Alternatively or in addition, the fixing can comprise using at least one mechanical fixing mechanism. The fixing mechanism can comprise at least one screw, or at least one pin, or at least one clamp, or at least one at least one bolt, or any combination thereof.

The fixing mechanism can comprise at least one pin in an opening, groove or passage in the fixture housing and in an opening, or groove or passage of the toric insert. The at least one pin can be used in a method comprising passing the at least one pin through an opening, groove or passage in the fixture housing and in an opening, groove or passage of the toric insert.

The fixing mechanism can comprise at least one locating screw, such as, for example, at least one locating screw located generally opposite at least one of the two intersecting surfaces which form the generally V-shaped region of the fixture housing, or generally opposite the intersection of the two intersecting surfaces.

In a particular example, the fixing mechanism can comprise a single locating screw located generally opposite an intersection of the two intersecting surfaces which form the generally V-shaped region of the fixture housing.

The method of the present disclosure can further comprise a step of orienting the toric insert without an orientation mark in the orientation mark fixture. The step of orienting the toric insert can be used to assist in rotationally positioning the toric insert in the orientation mark fixture such that the orientation mark can be formed at a desired location on the toric insert. In a particular example, orienting the toric insert in the fixture housing can assist in rotationally positioning the insert in the fixture so that the orientation mark is formed on the insert in a desired location relative to a toric zone of the insert.

In one example of a method comprising the orienting step, the bottom of the toric insert can include a groove, for example, referred to as an insert groove, and the orientation mark fixture can further comprise a pin. The step of orienting the insert can comprise placing the pin into both the fixture and the groove of the insert and thereby orienting the insert in the fixture with respect to the location of the groove on the bottom of the insert. As used herein, the bottom of the toric insert refers to the end of the insert which is opposing or substantially opposing the optical molding surface of the insert.

In a particular example, placing the pin into both the fixture and the groove of the insert can result in both fixing the toric insert without an orientation mark to the orientation mark fixture, and in orienting the toric insert without an orientation mark in the orientation mark fixture, for example, with respect to the location of the groove on the bottom of the insert. In this example, using the pin serves both to orient the insert with respect to the fixture, and to fix the insert to the fixture.

In another example of a method comprising the orienting step, the bottom of the toric insert can be flat, the orientation mark fixture can comprise a fixture groove or ridge located on an interior or exterior surface of the fixture housing, and the orienting step comprises using the fixture groove or ridge to orient the insert in the fixture with respect to the location of the fixture groove or ridge. In one example, the method can further comprise using the fixture groove or ridge described herein to hold the toric insert in a desired position until the toric insert is fixed to the housing using, for example, a fixing mechanism.

In yet another example of a method comprising the orientation step, wherein the fixture comprises a passage adapted to accommodate the back end of the toric insert, the passage can be sized or shaped or both sized and shaped to accommodate the shape of the back end of the toric insert, and the orienting step can comprise using the passage and the back end of the toric insert to orient the insert in the fixture. In other words, the passage and the back end of the insert can be similarly shaped, with the passage having slightly larger dimensions so as to accommodate the insert. In one example, the passage and the back end of the insert can be rectangular in shape. As used herein, the back end or back end portion of the toric insert refers to the end or end portion of the toric insert extending away from the optical molding surface of the toric insert.

The method of the present disclosure can be a method in which the orientation mark fixture comprises a metal. The method can be a method in which the toric insert comprises a metal.

The step of forming the orientation mark on the toric insert can comprise any method of machining the insert so as to form a mark on the insert of suitable quality such that the marked insert can be used to form an optical molding surface, and such that the orientation mark to be formed will be present in both the optical molding surface directly molded from the insert, and in the cast molded lens molded using the mold section formed using the insert. In one example, the step of forming the orientation mark on the toric insert can comprise using a wire. In a particular example, the step of forming the orientation mark on the toric insert can comprise using a wire EDM CNC machine.

Once the orientation mark is formed on the toric insert, in accordance with the present disclosure, the toric insert with the orientation mark can be removed from the fixture. The toric insert with the orientation mark may be used or employed to form a toric contact lens mold section, for example, using conventional and well known techniques, such as polymer injection molding techniques, to produce or form a polymeric toric contact lens mold section.

The toric contact lens mold section so produced can be used, for example, in combination with another contact lens mold section, in producing a polymeric toric contact lens. Such contact lens producing method or process may include a number of steps, for example, filling a cavity between the mold sections with a polymerizable precursor composition to form a mold assembly, subjecting the filled mold assembly to conditions, for example, heat and/or UV radiation, to polymerize the precursor composition to form a contact lens product in the cavity between the mold sections; demolding the cured mold assembly, after demolding, delensing the contact lens product from one of the mold sections, and further processing the contact lens product to form an acceptable, for example, ophthalmically compatible, contact lens. Each of the above-noted steps using the toric contact lens mold section formed in accordance with the disclosed method may be conducted using techniques which are conventional and well known in the art.

The method of the present disclosure can be a method in which the toric contact lens is a cast molded, soft, toric contact lens. The method of the present disclosure can be a method of manufacturing a cast molded toric contact lens, including a method of manufacturing a cast molded, hydrogel, toric contact lens, such as, for example, a cast molded, silicone hydrogel, toric contact lens.

The fixture of the present disclosure may comprise a fixture housing comprising a single part structured to hold a toric contact lens insert, for example, an insert without an orientation mark, at an angle specified for the placement of an orientation mark on the toric insert. The housing may include intersecting surfaces forming a generally V-shaped region on which a toric contact lens insert is placed. The generally V-shaped region can contact the toric contact lens insert at two different contact points, contact lines or contact areas, depending upon how the generally V-shaped region is structured.

A fixture for positioning a toric contact lens insert to facilitate forming an orientation mark on the insert is disclosed and comprises:

a fixture housing comprising a single, for example, unitary, part structured to hold a toric contact lens insert at an angle specified for the placement of an orientation mark on the toric insert, the housing having intersecting surfaces forming a generally V-shaped region on which a toric insert is placed, the generally V-shaped region contacts the toric insert at two different contact points, lines or areas; and at least one fixing mechanism operable to fix the position of the toric contact lens insert relative to the fixture housing.

The fixture housing can include an opening. The opening can be sized and shaped to at least partially accommodate a toric insert to be placed into the opening, where the toric insert is placed into the opening such that the region of the toric insert on which the orientation mark is to be formed is exposed. In one example, the opening of the fixture housing can have a varying structure. For example, a top half or top portion of the opening can be generally curved, or generally circular, or generally cylindrical, or any combination thereof, in configuration. Both side portions of the opening can be substantially planar, although other configurations are possible. In one particular example, the bottom half or bottom portion of the opening 32 can be defined by two angularly disposed surfaces 38 and 40 which come together at a rounded intersection, where the combination of the angularly disposed surfaces and the rounded intersection produces a generally V-shaped region. For example, the surfaces may be disposed at an angle in a range of about 75° or less to about 105° or more relative to each other. The surfaces may be disposed at an angle of about 90° relative to each other.

The generally V-shaped region of the fixture can extend into the fixture housing a sufficient distance to allow the toric insert to be properly placed in and fixed to the fixture, for example, in an opening, to facilitate forming an orientation mark on the insert.

The generally V-shaped region of the fixture housing can be effective in allowing a wide variety of sizes of the generally circular-shaped toric inserts to be substantially centered within the fixture housing without the need for any adjustments to the housing. Thus, as the fixture housing can accommodate a wide range of insert dimensions, it can also accommodate inserts having a wide range of dimensional tolerances.

In one example, the fixture of the present disclosure can be a fixture in which the generally V-shaped region is effective to centralize the toric contact lens insert in the fixture based on a diameter of the toric insert.

The generally V-shaped region of the fixture housing can also be effective in allowing a wide variety of types of toric inserts to be used with the fixture housing, as the generally V-shaped region of the fixture housing allows for different types of fixing mechanisms to be used to secure the insert to the fixture housing during the machining, based on the design of the toric inserts themselves.

In one example, the fixing mechanism can comprise an adhesive substance such as, for example, an adhesive wax. Additionally or alternatively, the fixing mechanism can comprise a mechanical fixing mechanism. The fixing mechanism can comprise at least one screw, or at least one pin, or at least one clamp, or at least one bolt, or any combination thereof. The fixing mechanism can comprise at least one locating screw, such as, for example, at least one locating screw located generally opposite at least one or both of the two intersecting surfaces of the fixture housing. In a particular example, the fixing mechanism can comprise a single locating screw located generally opposite an intersection of the two intersecting surfaces which form the generally V-shaped region of the fixture housing.

The fixture of the present disclosure can further comprise at least one orienting mechanism. The orienting mechanism can be effective to orient the toric contact lens insert in the fixture housing. The orienting mechanism can be effective to rotationally position the toric insert in the orientation mark fixture to form the orientation mark at a desired location on the toric insert. For example, the orienting mechanism can be effective to position the toric insert in the fixture relative to a toric zone of the insert.

In one example, the orienting mechanism can comprise a pin positioned within the fixture housing, wherein the pin passes into and/or through a groove of the toric insert, the toric insert has a bottom opposite an optical molding surface, the bottom has the groove, the groove has a width to accommodate the pin, and the groove is located on a bottom of the toric insert.

The fixture of the present disclosure can be a fixture in which the pin is positioned and effective to orient an orientation mark on a toric contact lens insert fixed to the fixture housing with respect to the groove located in the toric contact lens insert fixed to the fixture housing regardless of any variation of the width of the groove.

In a particular example, the pin is both one of the at least one fixing mechanism operable to fix the position of the toric insert relative to the fixture housing, and one of the at least one orientation mechanism effective to orient the toric contact lens insert.

In another example, the orientation mechanism can comprise a fixture groove or ridge. The fixture groove or ridge can be located on an interior or exterior surface of the fixture housing. In this example, the toric insert can be a toric insert having a flat bottom surface substantially opposing the optical molding surface of the insert. The fixture groove or ridge can be adapted to orient the flat bottomed toric insert in the fixture housing, for example, to orient the toric insert with respect to a location of the fixture groove or ridge.

In yet another example, the orientation mechanism can comprise an additional passage within the fixture housing adapted to accommodate a back end of the toric insert. The passage of the fixture housing can be sized and shaped to accommodate the back end of the toric insert. The passage of the fixture and the back end of the toric insert can be similarly shaped, with the passage having slightly larger dimensions so as to both accommodate the insert and prevent or restrict its rotation relative to the fixture housing. In one such example, the passage and the back end of the insert can both be rectangular in shape.

A fixing mechanism such as a pin or a locating screw can be used in combination with the passage adapted to accommodate the back end of the toric insert. In one particular example, a locating screw located generally opposite the generally V-shaped region of the fixture housing can be used.

In one example which is particularly useful with an orientation mechanism comprising an additional passage within the fixture housing, the back end portion of the toric insert is relatively long, i.e., has a length such that, when the toric insert is positioned within the housing in the opening on the generally V-shaped region, the portion of the toric insert which is present within the opening of the fixture housing and extends outside the opening is considered to have a length X; the back end portion of the toric insert which extends into the passage portion of the fixture is considered to have a length Y; and Y is at least 1 times X, or at least 1.5 times X, or at least 2 times X.

The disclosed fixture housing may be made of any suitable material of construction or combination of materials of construction. In one example, the fixture housing is made of one or more metals. The fixture of the present disclosure can be a fixture in which the fixture housing comprises a metal. In one example, the fixture comprises at least one metal.

Figures 1, 3:
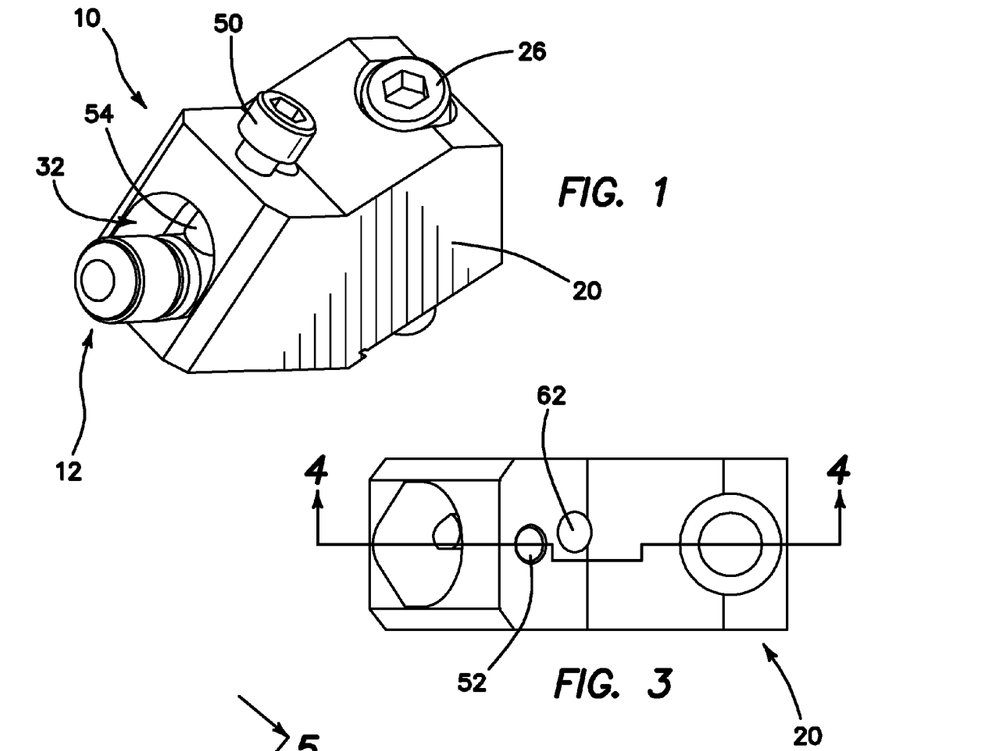
FIG. 1 is a top side view, in perspective, of an orientation mark fixture, holding a toric insert, in accordance with the present disclosure.
FIG. 3 is a top plan view of a fixture housing of the orientation mark fixture shown in FIG. 1.

Referring now to the drawings, FIG. 1 shows an example of an orientation mark fixture 10 used to hold a toric contact lens insert 12 (without an orientation mark) while an orientation mark is formed on the insert.

Figure 2:
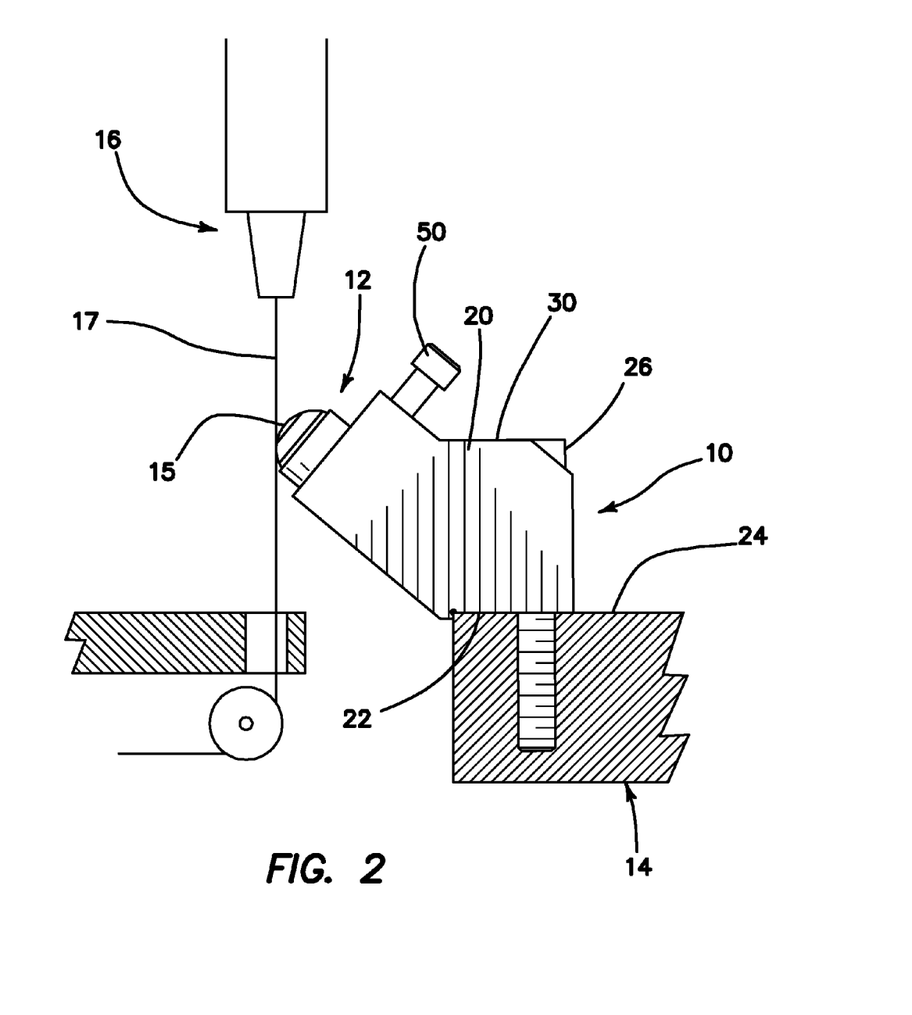
FIG. 2 is a somewhat schematic view showing an orientation mark being cut into the toric insert held by an orientation mark fixture in FIG. 1, the cutting being done using an EDM CNC machine.

With reference to FIG. 2, the fixture 10 is shown secured to a stationary base 14, to maintain the fixture in a stationary position while a conventional EDM CNC machine 16 is being employed to form the orientation mark on the insert 12. The EDM CNC machine 16 includes a wire 17 which comes into contact with insert 12 to form the orientation mark on the insert, for example, on the optical molding surface 15 of the insert.

Figure 4:
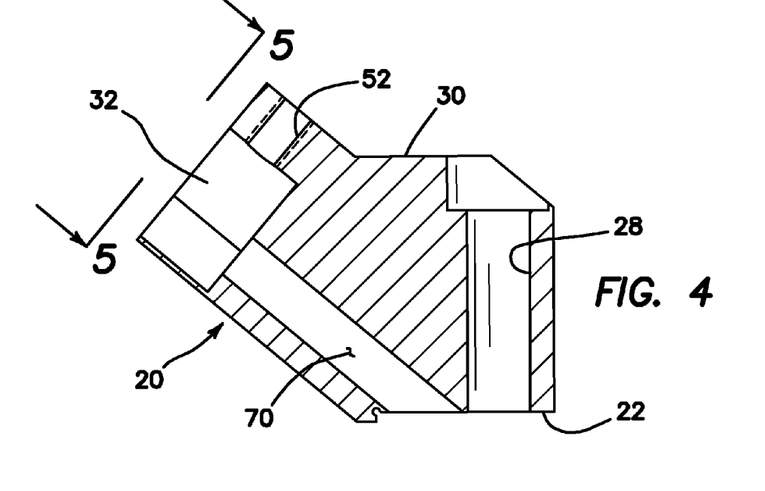
FIG. 4 is a cross-sectional view taken along line 4-4 of FIG. 3.

Again, with reference to FIG. 1, as well as FIGS. 3 and 4, the fixture 10 includes a fixture housing 20 which is a single or unitary piece or component and is structured to facilitate the securement of fixture 10 to a stationary base 14, and to facilitate precisely securing or positioning the toric insert 12 to provide the proper placement of the orientation mark on the insert.

The fixture housing 20 is structured so that the toric insert 12 is positioned at the exact, or substantially exact, angle specified for the orientation mark. The single piece structure of the fixture housing 20 reduces or even substantially eliminates error or errors due to cumulative tolerances that may result from a fixture housing made of multiple (more than one) parts or pieces.

With regard to FIG. 2, fixture housing 20 includes a lower, planar surface 22 which is positioned against top planar surface 24 of stationary base 14. A threaded screw 26 can be placed in through opening 28 (FIG. 4) in fixture housing 20. Through opening 28 extends from lower surface 22 to upper surface 30 of fixture housing 20. The threaded screw 26 can be placed in through opening 28 and fixedly secured to stationary base 14. This threaded screw can be used to fixedly secure fixture housing 20 in place relative to stationary base 14, although fixedly securing the fixture housing 20 in place relative to the stationary base 14 is optional, and, when the fixture housing 20 is fixedly secured in place relative to the stationary base 14, other methods of securing the fixture housing 20 can be used.

Figure 5:
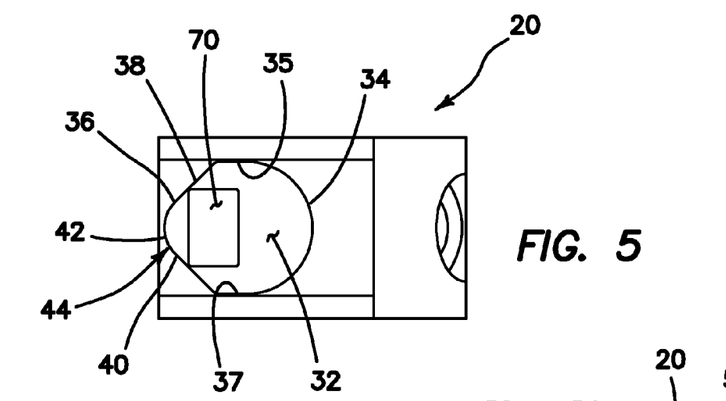
FIG. 5 is a plan view of the fixture housing taken along line 5-5 of FIG. 4.

As shown in FIGS. 1, 2 and 3, fixture housing 20 includes an opening 32. Toric insert 12 is partially located in opening 32, as shown in FIG. 1. The opening 32, as shown in FIG. 5, has a varying structure. The top half (right half in FIG. 5) 34 of opening 32 is shaped to allow insertion of an optical insert into the fixture housing 20. For example, as illustrated in the figures, the top half of opening 32 can be curved, generally circular, and cylindrical, in configuration. As illustrated in FIG. 5, the side portions 35 and 37 of opening 32 of the fixture housing 20 are substantially planar, although other configurations are possible. The bottom half (left half in FIG. 5) 36 of opening 32 is defined by two angularly disposed surfaces 38 and 40 which come together at a rounded intersection 42. The combination of the angularly disposed surfaces 38 and 40 and the rounded intersection 42 produces a generally V-shaped region 44.

The surfaces 38 and 40 of the opening 32 of the fixture housing 20 may be disposed, for example, at an angle in a range of about 75° or less to about 105° or more relative to each other. In one example, the surfaces 38 and 40 may be disposed at an angle of about 90° relative to each other. In one example, each of the surfaces 38 and 40 may be of the same, or substantially the same, size and/or shape.

The generally V-shaped region 44 extends into fixture housing 20 a sufficient distance to allow the toric insert 12 to be properly placed and fixed in opening 32 to facilitate forming an orientation mark on the insert.

The generally V-shaped region 44 in the opening 32 is effective in allowing a wide variety of sizes of the generally circular-shaped toric inserts 12 having generally circular shaped sidewalls to be substantially centered within the fixture housing without the need for any adjustments to the housing. Thus, as the fixture housing can accommodate a wide range of insert dimensions, it can also accommodate inserts having a wide range of dimensional tolerances.

The generally V-shaped region 44 in the opening 32 is also effective in allowing a wide variety of types of toric inserts to be used with the fixture housing, as the generally V-shaped region of the fixture housing allows for different types of fixing mechanisms to be used to secure the insert to the fixture housing during the machining, based on the design of the toric inserts themselves.

Figure 5A:
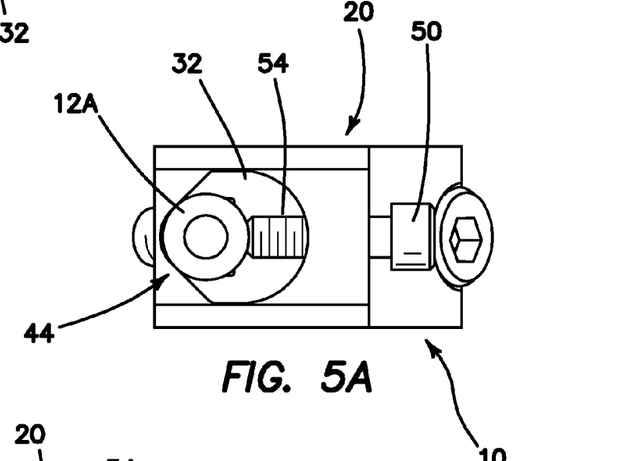
FIG. 5A is a plan view of the fixture housing in FIG. 5 with a relatively small toric insert being held in the housing.
Figure 5B:
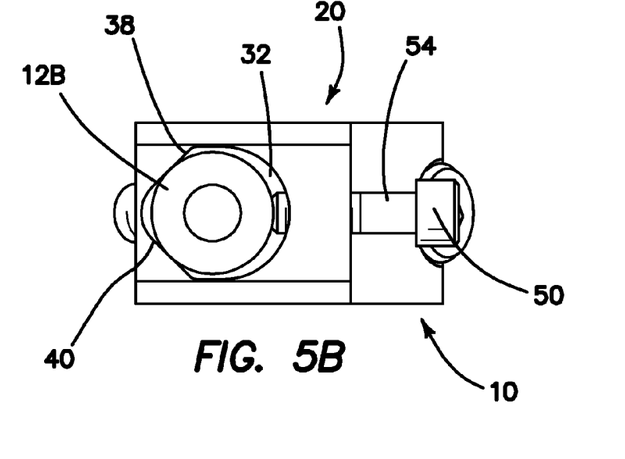
FIG. 5B is a plan view of the fixture housing in FIG. 5 with a relatively large toric insert being held in the housing.
Figure 6:
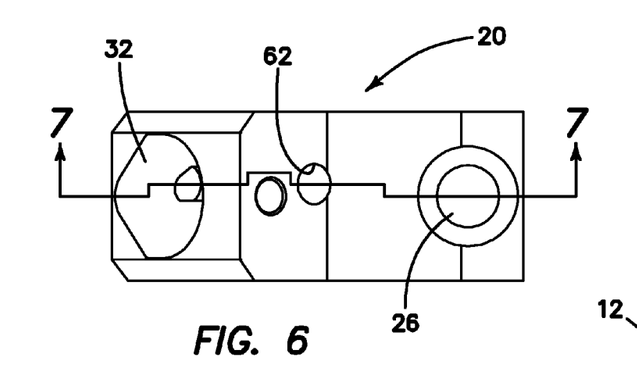
FIG. 6 is a top plan view of the fixture housing of the orientation mark fixture shown in FIG. 1, with the toric insert removed (similar to FIG. 3).

The present fixture, including the example illustrated in FIGS. 5A and 5B, can be particularly useful for forming orientation marks on toric inserts of differing sizes. The present fixture 10 may be structured to be able to be used with different sized toric inserts. For example, the toric insert 12A, shown in FIG. 5A, is relatively small. However, the generally V-shaped region 44 is effective in centering relatively small toric insert 12A in its desired or proper position for forming an orientation mark on the insert. The generally V-shaped region 44 still provides two spaced apart points, lines or areas of contact.

If an orientation mark is to be formed on a larger toric insert, that is a toric insert that has a relatively large outer diameter, for example, an outer diameter larger than toric insert 12A, such as toric insert 12B in FIG. 5B, the same fixture 10 can be used. With the larger toric insert 12B, the generally V-shaped region 44 still provides two points, lines or areas to center the toric insert 12B relative to the fixture 10, as desired.

In one example, as illustrated in FIGS. 1-4, 5A and 5B, a locating screw 50 can be used to secure or fix the toric insert 12 to the fixture housing 20. As shown in FIG. 1, the locating screw 50 is passed into fixture housing 20 through threaded bore 52 (FIG. 4) to come into contact with toric insert 12, which is partially located in opening 32. Locating screw 50 is placed so that the stem 54 of screw 50 comes into contact with the toric insert 12 to hold the insert in a desired position, as shown in FIG. 1. In this example, the generally V-shaped region 44 provides two spaced apart lines or areas of contact with the toric insert 12 which center the toric insert 12 within the fixture housing 20 without the need for any adjustment. These two spaced apart lines or areas of contact, which include a portion of each of angularly disposed surfaces 38 and 40, together with the contact area provided by the locating screw stem 54, which is also spaced apart from the lines or areas of contact provided by the generally V-shaped region 44, provide for very effective placement and fixation of the toric insert 12 in the fixture housing 20.

Placing the toric insert 12 in the proper or desired location relative to the fixture housing 20 is important, and maintaining such proper or desired location is also important. The spaced apart contact points, lines or areas provided by the generally V-shaped region 44 and the locating screw 50 facilitate both proper placement and fixating of the toric insert 12 relative to the fixture housing 20.

The example of the structure of the fixture 10 in combination with the locating screw 50, such as the example illustrated in FIGS. 5A and 5B, can be particularly useful for relatively small toric inserts. For relatively small toric inserts, the combination of the generally V-shaped region 44 and the locating screw 50 can be used and is effective in placing and fixing relatively small toric insert 12A in its desired or proper position for forming an orientation mark on the insert. The generally V-shaped region 44 still provides two spaced apart points, lines or areas of contact and the locating screw 50 provides a third spaced apart contact point or region. With a small insert, such as toric insert 12A, the locating screw 50 needs to be extended further into the opening 32 in order to fix the toric insert 12A in place relative to fixture housing 20. In addition, with the relatively small insert 12A, the two spaced apart contact points, lines or areas on generally V-shaped region 44 are relatively close to each other.

With the larger toric insert 12B, the generally V-shaped region 44 and the locating screw 50 still provide three spaced apart points, lines or areas of contact to securely place and fix the toric insert 12B relative to the fixture 10, as desired. With the larger toric insert 12B, the locating screw 50 is extended only a relatively short distance into space 32 before the insert is fixed in the desired or proper position relative to fixture 10 and the two spaced apart contact points, lines or areas on generally V-shaped region 44 are positioned relatively far from each other. In contrast, with the relatively small insert 12A, the two spaced apart contact points, lines or areas on generally V-shaped region 44 are positioned relatively close to each other.

Figure 8:
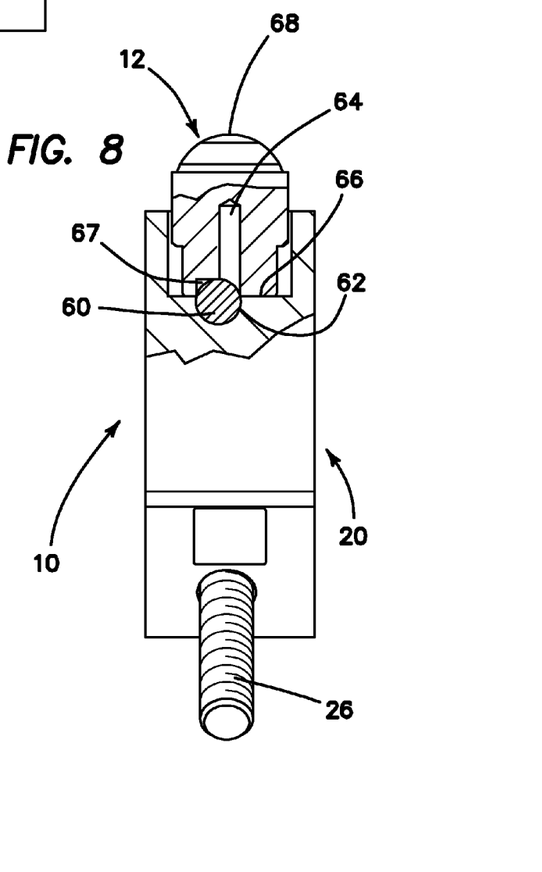
FIG. 8 is a view, partly in cross-section taken along line 8-8 of FIG. 7 with the orientation mark fixture holding a toric insert.

In another example, for an insert having a groove on its back surface into which a pin can be inserted, the orientation mark fixture 10 can comprise a pin 60 which is used to secure the toric insert 12 to the fixture housing 20. As illustrated in FIG. 8, toric insert 12 can include an insert groove 64 which extends from the back surface 66 of the insert toward the front 68 of the insert and also extends across the back surface of the insert. In FIG. 8, the insert groove 64 includes a wider back portion 67 which extends outwardly on one side of the back end of groove 64. The wider back portion 67 of the insert groove 64 extends inwardly from the back surface 66 of the insert a small distance into the insert. The wider back portion 67 of insert groove 64 also extends inwardly across the back surface 66 of the insert to allow the pin 60 to be received in wider back portion 67.

Figure 7:
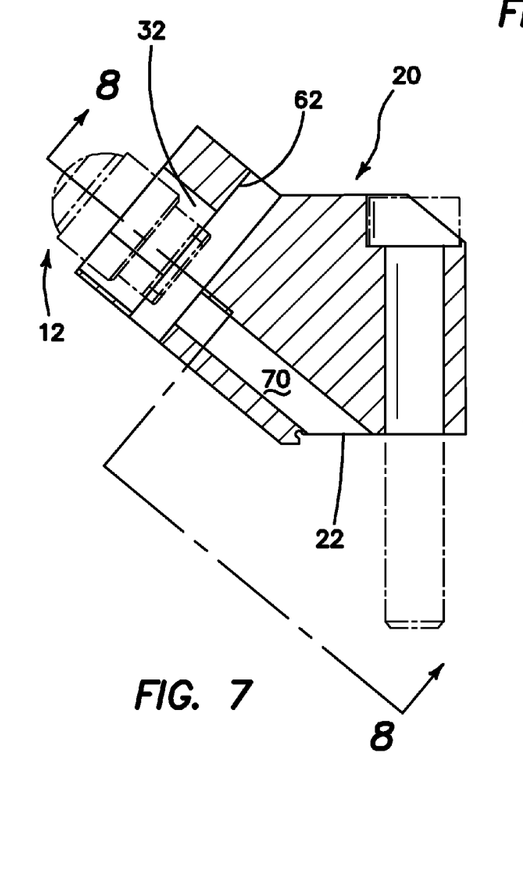
FIG. 7 is a cross-sectional view taken along line 7-7 of FIG. 6, with a toric insert shown in shadow lines in place in the fixture housing.

The insert groove 64 is used to hold the insert 12 when the insert is employed in making contact lens mold sections. With reference to FIGS. 7 and 8, the fixture 10 includes a pin 60, which is placed in through hole 62 in fixture housing 20 when the toric insert 12 is in place in the fixture 10. The pin 60, in through hole 62, passes through groove 64, in particular through the wider back portion 67 of groove 64, of the toric insert 12 and secures the insert 12 to the housing 20. In this example, the pin 60, inserted into the wider back portion 67 of groove 64 of the toric insert 12 through the hole 62 in the fixture housing, serves to secure the toric insert 12 to the housing after the toric insert has been centered in the generally V-shaped region 44.

The pin 60 is sized to fit into insert groove 64, in particular through the wider back portion 67 of groove 64, so that when insert 12 is placed partially into opening 32 of fixture housing 20 and pin 60 is passed through hole 62, the pin 60 is positioned at least partially within wider back portion 67 of insert groove 64, as shown in FIG. 8, so that insert 12 is prevented from rotating.

Thus, the combination of fixture housing 20, insert groove 64, including wider back portion 67, hole 62 and pin 60 is effective to further restrict the insert 12 from moving, e.g., rotating, relative to fixture 10.

Thus, insert 12 is centered relative to fixture 10 by being placed on the generally V-shaped region 44, and is secured or fixed to and oriented in the fixture by passing pin 60 through hole 62 to fit pin 60 into wider back portion 67 of insert groove 64.

Once insert 12 is so fixed in place relative to fixture 10, a conventional EDM CNC machine 16 can be employed to form an orientation mark on insert 12, for example, as illustrated in FIG. 2.

In one example, the size of pin 60 relative to the size of groove 64, in particular the wider portion 67 of groove 64, can be such that the pin 60 is effective to fix the rotational orientation of the insert within a dimensional tolerance of ±10%, or ±5%, or ±1%.

The size and/or configuration of the insert groove 64 and the pin 60 can be varied, as desired.

This is illustrated with reference to FIGS. 8A and 8B. Components in FIGS. 8A and 8B which correspond to components in FIG. 8 are identified with like reference numbers followed by A (in FIG. 8A) and B (in FIG. 8B). Except as expressly stated herein, the apparatus illustrated in FIGS. 8A and 8B are structured and function similarly to the apparatus illustrated in FIG. 8.

Figures 8A, 8B:
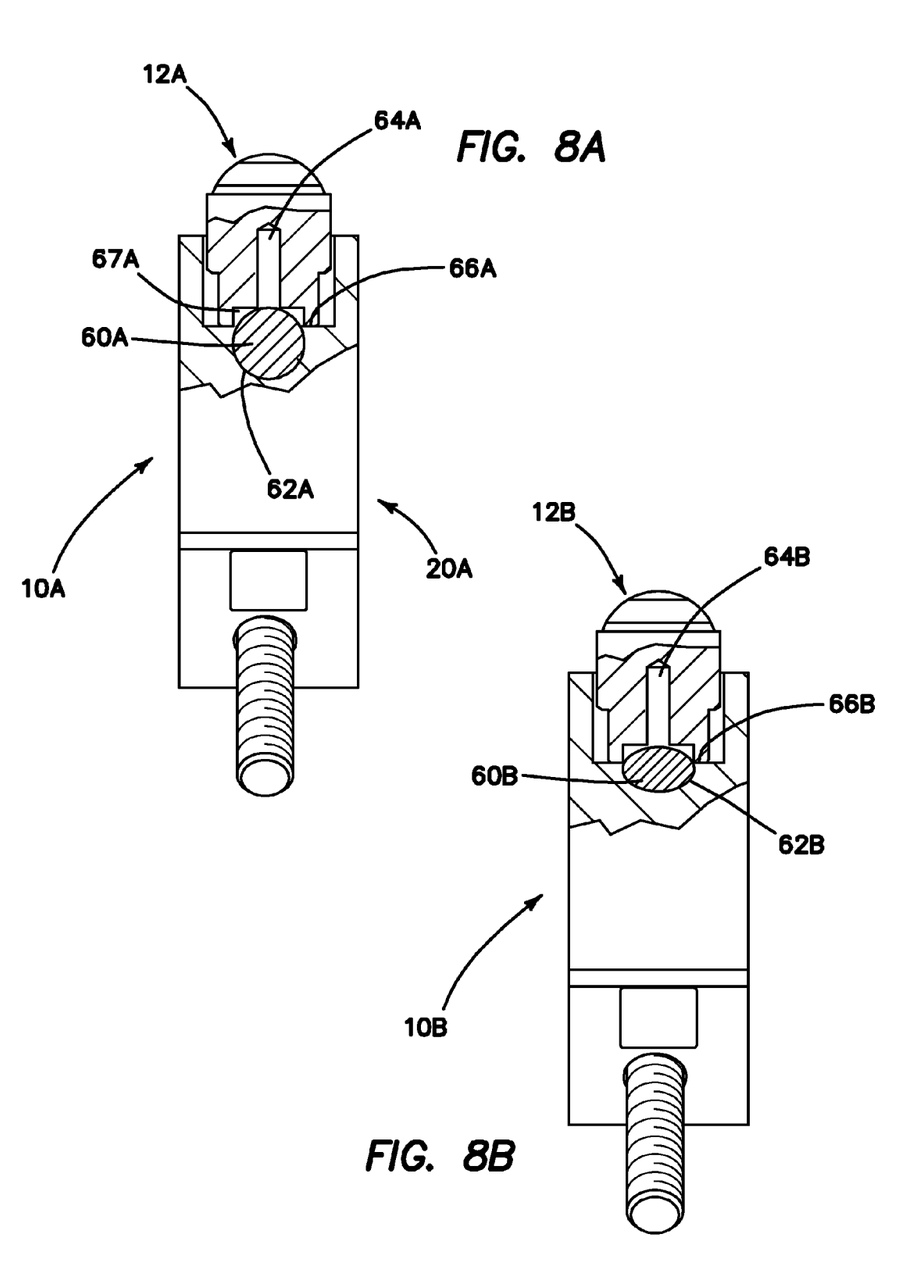
FIG. 8A is a view, partly in cross-section, similar to FIG. 8 with the orientation mark fixture holding an alternate toric insert.
FIG. 8B is a view, partly in cross-section, similar to FIG. 8, with the orientation mark fixture holding a further toric insert.

In FIG. 8A, the insert groove 64A, which extends inwardly from the back surface 66A of the insert 12A, includes a wider back portion 67A which extends outwardly around all of the back of groove 64A. The wider back portion 67A of the insert groove 64A also extends inwardly across the back surface 66A of the insert to allow the pin 60A to be received in wider back portion 67A.

The pin 60A is placed through a hole 62A in fixture housing 20A, when the toric insert 12A is in place on the generally V-shaped region (not shown) of the fixture 10A, thereby passing through groove 64A, in particular through the wider back portion 67A of groove 64A, of the toric insert 12A and secures the insert 12A to the fixture housing 20A.

Fixture 10A is structured and functions substantially similar to fixture 10.

The primary differences between fixture 10 and fixture 10A are the sizes of pin 60A and hole 62A. In particular, pin 60A is larger in diameter than pin 60. Also, the wider back portion 67A of groove 64A is larger than wider back portion 67 of groove 64. In addition, the location of the hole 62A in fixture housing 20A is different relative to the location of hole 62 in fixture housing 20, because of the difference in the location and size of the wider back portion 67A of groove 64A relative to wider back portion 67 of groove 64.

In FIG. 8B, fixture 10B is shown and is structured substantially similar to and functions substantially similar to fixture 10A in FIG. 8A.

The primary difference between fixture 10B and fixture 10A is the configuration of hole 62B and pin 60B. In particular, as shown in FIG. 8B, pin 60B has a non-circular cross-section, in particular an oval or ovoid cross-section. The size and/or configuration of the wider back portion 67B of insert groove 64B may be modified, as needed or desired, to accommodate the size and/or shape of pin 60B.

An additional feature of the fixture housing 20 may be channel 70. As shown in FIG. 4, channel 70 extends from opening 32 rearwardly through the fixture housing 20 to and through lower surface 22 of fixture housing 20. Channel 70 has a substantially rectangular cross section, as best shown in FIG. 5.

Channel 70 may be used in forming orientation marks on toric inserts, for example, long toric inserts, which have flat or substantially flat bottom or back surfaces, and have back portions having rectangular cross-sections.

The rectangular back portion of the long toric insert is of a size so as to fit into channel 70 and be restricted from rotation relative to channel 70. The channel 70 may be dimensionally slightly larger than the back portion of the long toric insert so that the back portion can be relatively easily placed into the channel.

With the long toric insert in place in fixture housing 20 (on generally V-shaped region 44), the rectangular back portion of the long toric insert is positioned within the channel 70 so that the long toric insert is prevented or restricted from rotating relative to fixture housing 20. Locating screw 50 may also be used to fix the long toric insert in place relative to the fixture housing 20. When a long toric insert with a flat or substantially flat bottom or back surface is employed, the pin 60 may not be employed.

Once the long insert is so fixed in place relative to fixture 10, a conventional EDM CNC machine 16 can be employed to form an orientation mark on the long insert.

A number of publications and patents have been cited and/or referred to herein. Each of the cited publications and patents are hereby incorporated by reference in their entireties.

While the methods and apparatus disclosed herein have been described with respect to various specific examples and illustrations, it is understood that the methods and apparatus are not limited thereto and can be variously practiced within the scope of the following claims.

What is claimed is:

1. A method of manufacturing a toric contact lens comprising:

providing a toric contact lens insert without an orientation mark to be used in forming a toric contact lens mold section, the toric contact lens insert including a bottom and a groove across the bottom;

placing the toric contact lens insert without an orientation mark in an orientation mark fixture comprising a single piece fixture housing structured to hold a toric contact lens insert at an angle specified for an orientation mark, and a pin, the fixture housing having intersecting surfaces which form a generally V-shaped region on which the toric contact lens insert is located, the generally V-shaped region contacting the toric contact lens insert at two different contact points, lines or areas;

orienting the toric contact lens insert without an orientation mark in the orientation mark fixture, the orienting the toric contact lens insert comprises placing the pin into both the fixture and the groove of the toric contact lens insert, thereby orienting the toric contact lens insert in the fixture with respect to the location of the groove on the bottom of the toric contact lens insert;

fixing the toric contact lens insert without an orientation mark to the orientation mark fixture;

forming an orientation mark on the toric contact lens insert fixed to the orientation mark fixture;

removing the toric contact lens insert with the orientation mark from the orientation mark fixture;

using the toric contact lens insert with the orientation mark to form a toric contact lens mold section; and using the toric contact lens mold section to form a toric contact lens.

2. The method of claim 1, wherein the fixing the toric contact lens insert comprises fixing the toric contact lens insert using at least one fixing mechanism.

3. The method of claim 2, wherein the at least one fixing mechanism comprises a locating screw located generally opposite an intersection of the intersecting surfaces.

4. The method of claim 1, wherein placing the pin into both the fixture and the groove of the toric contact lens insert results in fixing the toric contact lens insert without an orientation mark to the orientation mark fixture and orienting the toric contact lens insert without an orientation mark in the orientation mark fixture.

5. The method of claim 2, wherein placing the pin into both the fixture and the groove of the toric contact lens insert results in fixing the toric contact lens insert without an orientation mark to the orientation mark fixture and orienting the toric contact lens insert without an orientation mark in the orientation mark fixture.

6. The method of claim 3, wherein placing the pin into both the fixture and the groove of the toric contact lens insert results in fixing the toric contact lens insert without an orientation mark to the orientation mark fixture and orienting the toric contact lens insert without an orientation mark in the orientation mark fixture.

7. The method of claim 1, which comprises using a wire in forming the orientation mark on the toric contact lens insert.

8. The method of claim 2, which comprises using a wire in forming the orientation mark on the toric contact lens insert.

9. The method of claim 3, which comprises using a wire in forming the orientation mark on the toric contact lens insert.

10. The method of claim 4, which comprises using a wire in forming the orientation mark on the toric contact lens insert.

11. A fixture for positioning a toric contact lens insert to form an orientation mark on the toric contact lens insert, the fixture comprising:
- a fixture housing comprising a single part structured to hold the toric contact lens insert at an angle specified for the placement of an orientation mark on the toric contact lens insert, the fixture housing having intersecting surfaces forming a generally V-shaped region on which the toric contact lens insert is placed, the generally V-shaped region contacts the toric contact lens insert at two different contact points, lines or areas; and
- at least one orientation mechanism effective to orient the toric contact lens insert, wherein the orientation mechanism comprises a pin positioned within the fixture housing, the pin passes through a groove of the toric contact lens insert, the toric contact lens insert has a bottom opposite an optical molding surface, the groove is located across the bottom of the toric contact lens insert, the groove has a width to accommodate the pin, and the orientation mechanism orients the toric contact lens insert in the fixture with respect to the location of the groove on the bottom of the toric contact lens insert; and
- at least one fixing mechanism operable to fix the position of the toric contact lens insert relative to the fixture housing.

12. The fixture of claim 11, wherein the fixing mechanism comprises a locating screw located generally opposite an intersection of the intersecting surfaces.

13. The fixture of claim 11, wherein the pin is one of the at least one fixing mechanism operable to fix the position of the toric contact lens insert relative to the fixture housing.

14. The fixture of claim 11, wherein the orientation mechanism comprises a passage within the fixture housing adapted to accommodate a distal end of the toric contact lens insert.

15. The fixture of claim 12, wherein the orientation mechanism comprises a passage within the fixture housing adapted to accommodate a distal end of the toric contact lens insert.

16. The fixture of claim 13, wherein the orientation mechanism comprises a passage within the fixture housing adapted to accommodate a distal end of the toric contact lens insert.

* * * * *